United States Patent
Gong et al.

(10) Patent No.: US 11,430,261 B2
(45) Date of Patent: Aug. 30, 2022

(54) TARGET RE-IDENTIFICATION

(71) Applicant: Vision Semantics Limited, London (GB)

(72) Inventors: Shaogang Gong, Middlesex (GB); Xiatian Zhu, London (GB); Hanxiao Wang, Malden, MA (US); Xu Lan, London (GB)

(73) Assignee: Vision Semantics Limited, London (GB)

(*) Notice: Subject to any disclaimer, the term of this patent is extended or adjusted under 35 U.S.C. 154(b) by 215 days.

(21) Appl. No.: 16/631,629

(22) PCT Filed: Jul. 17, 2018

(86) PCT No.: PCT/GB2018/052025
§ 371 (c)(1),
(2) Date: Jan. 16, 2020

(87) PCT Pub. No.: WO2019/016540
PCT Pub. Date: Jan. 24, 2019

(65) Prior Publication Data
US 2020/0218888 A1    Jul. 9, 2020

(30) Foreign Application Priority Data
Jul. 18, 2017 (GB) .................................. 1711541

(51) Int. Cl.
*G06V 40/16* (2022.01)
*G06K 9/62* (2022.01)
*G06N 5/04* (2006.01)
*G06N 20/00* (2019.01)
(Continued)

(52) U.S. Cl.
CPC ......... *G06V 40/173* (2022.01); *G06K 9/6201* (2013.01); *G06K 9/6257* (2013.01);
(Continued)

(58) Field of Classification Search
CPC combination set(s) only.
See application file for complete search history.

(56) References Cited

U.S. PATENT DOCUMENTS 9,600,717 B1 *   3/2017   Dai ........................ G06V 20/47
2013/0182105 A1   7/2013   Fahn et al.
(Continued)

FOREIGN PATENT DOCUMENTS

CN          106709449 A       5/2017

OTHER PUBLICATIONS

Xu Lan, "Deep Reinforcement Learning Attention Selection for Person Re-Identification," Jul. 10, 2017, Computer Vision and Pattern Recognition, arXiv:1707.02785, pp. 1-8.*
(Continued)

*Primary Examiner* — Omar S Ismail
(74) *Attorney, Agent, or Firm* — Banner & Witcoff, Ltd.

(57) ABSTRACT

A computer implemented method and system for training a machine to identify a target within video data, the method comprising the steps of providing a training data set including identified labelled targets within video data having the same target within different video views. Generating, using a learning model, a bounding box action policy for determining required adjustments to a bounding box around a target in the video data by: generating a bounding box around a labelled target within a first view of the video data. Converting the target bounded by the bounding box to a quantitative representation. Determining a matching level between the quantitative representation and a quantitative representation of a further labelled target within the video data from a second view different to the first view. Looping the following steps one or more times, the looped steps comprising: using the bounding box action policy to determine an action to change the bounding box. Applying the
(Continued)

determined action to change the bounding box to a new bounding box. Converting the target bounded by the new bounding box to a new quantitative representation. Determining a further matching level between the new quantitative representation and the quantitative representation of the labelled target within the video data from the second view. Applying a reward to the learning model to adjust the bounding box action policy based on an improvement in the matching level.

20 Claims, 6 Drawing Sheets

(51) Int. Cl.
    *G06V 10/22* (2022.01)
    *G06V 20/40* (2022.01)
(52) U.S. Cl.
    CPC ............ *G06K 9/6262* (2013.01); *G06N 5/04* (2013.01); *G06N 20/00* (2019.01); *G06V 10/22* (2022.01); *G06V 20/40* (2022.01); *G06V 2201/07* (2022.01)

(56) References Cited

U.S. PATENT DOCUMENTS

| | | | |
|---|---|---|---|
| 2016/0004904 | A1 | 1/2016 | Senechal et al. |
| 2017/0286774 | A1* | 10/2017 | Gaidon ................. G06V 10/10 |
| 2018/0089593 | A1* | 3/2018 | Patel ..................... G06F 30/00 |
| 2019/0073520 | A1* | 3/2019 | Ayyar ................. G06V 40/162 |
| 2019/0114804 | A1* | 4/2019 | Sundaresan .......... G06V 30/194 |

OTHER PUBLICATIONS

Ejaz Ahmed, "An Improved Deep Learning Architecture for Person Re-Identification," Jun. 2015, Proceedings of the IEEE Conference on Computer Vision and Pattern Recognition (CVPR), 2015, pp. 3909-3914.*

Yang Li, "Real-World Re-Identification in an Airport Camera Network," Apr. 11, 2014, ICDSC '14: Proceedings of the International Conference on Distributed Smart Cameras Nov. 2014 Article No. 35, https://doi.org/10.1145/2659021.2659039, pp. 1-6.*

Apr. 10, 2018, International Search Report and Written Opinion, PCT/GB2018/052025.

Jan. 17, 2018, Great Britain Search Report, GB 1711541.1.

Xu Lan et al., "Deep Reinforcement Learning Attention Selection for Person Re-Identification", British Machine Vision Conference, 2017, pp. 1-14.

Leslie Pack Kaelbling et al., "Reinforcement Learning: A Survey", Journal of Artificial Intelligence Research 4, (1996), pp. 237-285.

Bryan Prosser et al., "Person Re-Identification by Support Vector Ranking", British Machine Vision Conference, 2010, pp. 1-11.

* cited by examiner

TARGET RE-IDENTIFICATION

CROSS-REFERENCE TO RELATED APPLICATIONS

This application is a U.S. National Stage application under 35 U.S.C. § 371 of International Application PCT/GB2018/052025 (published as WO 2019/016540 A1), filed Jul. 17, 2018, which in turn claims the benefit of priority to Application GB 1711541.1 filed Jul. 18, 2017. Benefit of the filing date of each of these prior applications is hereby claimed. Each of these prior applications is hereby incorporated by reference in their entirety for all purposes.

FIELD OF THE INVENTION

The present invention relates to a method and apparatus for searching video data and in particular to searching for targets, such as people, within the video data. The method and system includes video target matching by attention search procedures.

BACKGROUND OF THE INVENTION

Effective and automatic association of information from multiple independent sources can be very useful for a wide range of applications including data mining, object and entity search and association, visual surveillance across a distributed source of visual inputs. In particular, the analysis of intelligence gathering data and inference from multiple independent sources of different types of information at different places and times can be valuable. Such collections of multi-source data (e.g. visual and non-visual) are often very large and either widely disparate (random) or closely akin (ambiguous) in their apparent attributes. Underlying intrinsic associations may often be highly context dependent, latent and sparse, as well as difficult to quantify for automatic discovery and data association.

For visual search and object re-identification in applications such as visual surveillance and multi-source visual object search, effective and reliable automatic object attribute extraction and association is very challenging in a large pool of multi-source visual data collected from distributed cameras or other sensor capturing sources. For instance, matching or tracking people across disjoint and disconnected different camera views, known as person re-identification, is challenging due to the lack of spatial and temporal constraints and visual appearance changes caused by variations in view angle, lighting, background clutter and occlusion. This can be even more challenging when the sources of each view are very different.

Person re-identification (re-id) aims at searching people across non-overlapping camera views distributed at different locations by matching person bounding box images. In real-world re-id scenarios, automatic person detection is very important for re-id to scale up to large size data sets. Most existing re-id test datasets (e.g. used for machine learning) are manually cropped, thus they do not fully address the re-id challenge in practice.

However, current auto-detected bounding boxes are not optimised for re-id tasks due to potentially more background clutter, occlusion, missing body part, and inaccurate bounding box alignment. Therefore, it may be necessary to introduce a human-in-the-loop cleaning process, which discards "bad" detections. Poorer detection bounding boxes are considered as "distractors" and not given re-id labelled data for model learning. In this context, there is a need for attention selection within auto-detected bounding boxes as an integral part of learning to optimise person re-id accuracy in a fully automated process.

Therefore, there is required a method and system that overcomes these problems.

SUMMARY OF THE INVENTION

In order to identify targets within different video views (either from the same source or from different sources) it is important to find the area of a video view (or other image data) that contains the target (e.g. a person). Including too much of the background or cropping the target will make identification more difficult. The present method and system using machine learning to improve this target selection.

The method and system uses a set of labelled data (e.g. a training set). A bounding box is generated around a labelled target. A recursive loop adjusts or changes the bounding box. Each time the bounding box is adjusted, a representation or properties of the target enclosed by the bounding box is compared against a known match from a different view. This provides feedback to a procedure or learning model that determines the next change to make to the bounding box. The learning model is updated based on this feedback, which may be based on a rewards system. After a number of loops and a number of different target pairs have been analysed then the learning model improves and can predict or adjust how the bounding box adjustments are made. In other words, a more accurate bounding box can be found with fewer adjustments as the learning model develops. Therefore the learning model can more quickly and accurately enclose the targets in the training data. Once the learning model is trained then it can be applied to real data to find more effectively bound unlabelled targets.

In accordance with a first aspect, there is provided a computer implemented method of training a machine to identify a target within video data, the method comprising the steps of:

providing a training data set including identified labelled targets within video data having the same target within different video views;

generating, using a learning model, a bounding box action policy for determining required adjustments to a bounding box around a target in the video data by:

generating a bounding box around a labelled target within a first view of the video data;

converting the target bounded by the bounding box to a quantitative representation;

determining a matching level between the quantitative representation and a quantitative representation of a further labelled target within the video data from a second view different to the first view; and looping the following steps one or more times, the looped step comprising:

using the bounding box action policy to determine an action to change the bounding box;

applying the determined action to change the bounding box to a new bounding box;

converting the target bounded by the new bounding box to a new quantitative representation;

determining a further matching level between the new quantitative representation and the quantitative representation of the labelled target within the video data from the second view; and applying a reward to the learning model to adjust the a bounding box action policy based on an improvement in the matching level.

Therefore, the learning model can be improved and more effectively select or bound targets such as people in images and video data. This bounding can then be used to isolate or identify targets in other video data. The policy may be a bounding box selection action sequence policy. The reward may be determined indirectly by using the matching level without any direct knowledge of true bounding box positions available for model reinforcement learning. Furthermore, the action policy and the reward may jointly select visual saliency by optimising the matching level without any explicit knowledge of true saliency available for model reinforcement learning. A further advantage is that the method may proceed without explicit knowledge on what's needed to be learned by the model (other existing reinforcement learning models must have that). Additionally, the reward discovers visual saliency by correlating with improving matching level indirectly rather than by relying on true examples of saliency available for model learning. Again this is a further advantage of the present approach compared to existing methods. Both of these properties improve scalability and are more generalisable to new data and new test domains. This model learning procedure becomes self-discovery rather than relying on strong supervised learning (with explicit labelling on what to learn), which is one essence or a critical limitation of all other reinforcement learning/deep learning neural network models.

Preferably, the quantitative representations may be sets of feature vectors. Feature vectors may be used more effectively, with machine learning techniques. Other quantitative representations may be used.

Optionally, the feature vectors may be 1-D high dimensional feature maps, 2-D feature maps, or 3-D volumes.

Optionally, the quantitative representations may be: matrices, or probability distributions or histograms.

Preferably, the first view and the second view may contain a target with the same label. This pair-wise label constraint (i.e. a pair of the same target in different views) provides unique information for finding the optimal bounding box location without the need for training examples of explicit true bounding box positions. Otherwise, the model may require a larger number (e.g. >10,000) of explicit true bounding box position annotations for model learning, which may not be available. However, the present method and system does not require a pair-wise label constraint. This relaxes the assumption and the model now only needs labelled target from any views (but it doesn't matter which view). This also is successful but the constraint may be weaker.

Preferably, the bounding box is rectangular. Other shapes may be used.

Optionally, the action to change the bounding box may be any one or more of: moving the bounding box up, down, left or right; reducing the size of the bounding box from the top, bottom, left and/or right; increasing the size of the bounding box to the top, bottom, left, and/or right, or any combination of these. In other words, the action may add or remove vertical or horizontal strips from the bounding box edges (in a rectangle). These may be of different sizes at the same time (loop), for example.

Advantageously, the reward may be a positive reward if the matching level improves and wherein the reward is a negative reward if the matching level decreases.

Preferably, the reward may be applied using a reward function. Different types of reward function may be used.

Preferably, the reward function may be formed from one or more of: a relative comparison reward, a reward by absolute comparison, and/or a reward by ranking.

Advantageously, the method may be implemented by a neural network. In one example, the neural network may have an output representation descriptor of 1024 neurons but a higher or lower number of neurons may be used. The total number of neurons of the neural network learning model may have between thousands of neurons to over one hundred million neurons.

Optionally, the loop may end when a criteria is reached.

Preferably, the computer implemented method may further comprise the steps of: using the bounding box action policy to predict a probability that the action will improve the matching level.

Optionally, the loop may end when the probability satisfies a target level.

Optionally, the loop may end after a predetermined number of loops. For example, this may be 10 action-steps in a fixed length sequence action policy. When determined by the probability, most often four to five action-steps may provide the optimal or final bounding box selection. The criteria may be combined (e.g. either when the probability reaches a target level and/or a number of loops is reached).

Preferably, the first view and the second view may come from different sources of data and/or video cameras. They may also come from the same source but be at different times or positions in the data. Sources may include any one or more of CCTV, mobile telephone video, dash cam video, social media and Internet sources in the various clouds, etc.

According to a second aspect, there is provided a computer implemented method of identifying a target within video data, the method comprising the steps of:
  receiving video data;
  generating bounding boxes around two or more targets within different views of the video data;
  converting the bounded targets to quantitative representations (e.g. sets of feature vectors);
  determining a matching level between the quantitative representations; and
  looping one or more times the following steps:
    using the bounding box action policy generated according to any previous statement to determine an action to change the bounding box around at least one of the two or more targets within the video data;
    applying the determined action to change the bounding box to a new bounding box;
    converting the target bounded by the new bounding box to a new quantitative representation (e.g. a new set of feature vectors);
    determining a further matching level between the new quantitative representation (e.g. new set of feature vectors) and the quantitative representation (e.g. set of feature vectors) of the labelled target within the video data.

Preferably, this is carried out on unknown or unlabelled data. Therefore, bounding boxes around potential targets in video data can be formed automatically and more reliably so that matches between targets in different views and/or sources of video data can be found more efficiently and quickly.

Optionally, the loop may end when the matching level satisfies a target level.

According to a third aspect, there is provided a system comprising:
  one or more processors (,e.g. local processors or distributed in a cloud); and memory storing instructions that, when executed by at least one processor, cause the processor to perform:

providing a training data set including identified labelled targets within video data having the same target within different video views;

generating, using a learning model, a bounding box action policy for determining required adjustments to a bounding box around a target in the video data by:

generating a bounding box around a labelled target within a first view of the video data;

converting the target bounded by the bounding box to a quantitative representation;

determining a matching level between the quantitative representation and a quantitative representation of a further labelled target within the video data from a second view different to the first view; and looping the following steps one or more times, the looped step comprising:

using the bounding box action policy to determine an action to change the bounding box;

applying the determined action to change the bounding box to a new bounding box;

converting the target bounded by the new bounding box to a new quantitative representation;

determining a further matching level between the new quantitative representation and the quantitative representation of the labelled target within the video data from the second view; and applying a reward to the learning model to adjust the a bounding box action policy based on an improvement in the matching level.

Optionally, the system may further comprise an interface for receiving the video data from one or more sources.

The methods described above may be implemented as a computer program comprising program instructions to operate a computer. The computer program may be stored on a computer-readable medium.

The computer system may include a processor or processors (e.g. local, virtual or cloud-based) such as a Central Processing unit (CPU), a single or a collection of Graphics Processing Units (GPUs). The processor may execute logic in the form of a software program. The computer system may include a memory including volatile and non-volatile storage medium. A computer-readable medium may be included to store the logic or program instructions. The different parts of the system may be connected using a network (e.g. wireless networks and wired networks). The computer system may include one or more interfaces. The computer system may contain a suitable operating system such as UNIX, Windows® or Linux, for example.

It should be noted that any feature described above may be used with any particular aspect or embodiment of the invention.

BRIEF DESCRIPTION OF THE FIGURES

The present invention may be put into practice in a number of ways and embodiments will now be described by way of example only and with reference to the accompanying drawings, in which.

It should be noted that the figures are illustrated for simplicity and are not necessarily drawn to scale. Like features are provided with the same reference numerals.

DETAILED DESCRIPTION OF THE PREFERRED EMBODIMENTS

Figure 1:
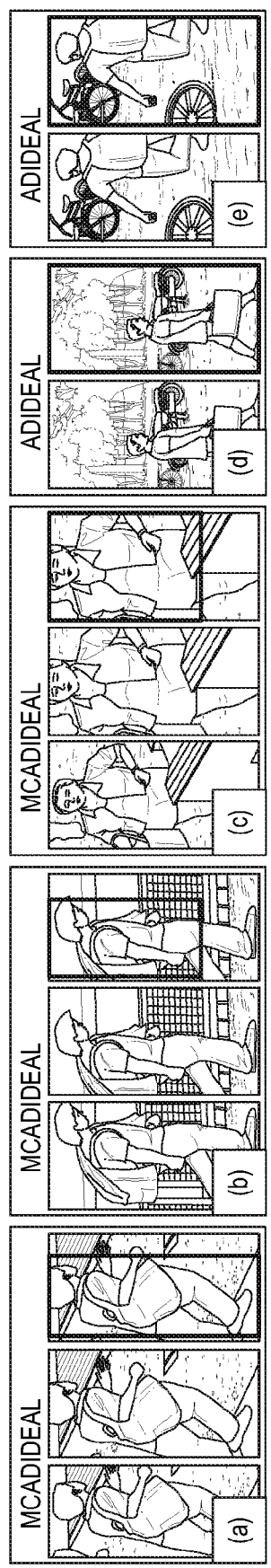
FIG. 1 (a-e) shows example comparisons of person bounding boxes by manually cropping (MC), automatically detecting (AD), and a result of an embodiment of the present system and method.

There is very little attempt in the prior art for solving the problem of attention selection (target bounding) within auto-detected bounding boxes for optimising person re-id. The present solution operates on any third party detectors independently so to benefit continuously from a wide range of detectors that may be developed in future.

According to some aspects, attention selection may be used within any auto-detected person bounding boxes for maximising re-id tasks. The model may be described as Identity DiscriminativE Attention reinforcement Learning (IDEAL) for attention selection post-detection given re-id discriminative constraints. Specifically, IDEAL is designed to locate automatically identity-sensitive attention regions within auto-detected bounding boxes by optimising recursively attending actions using reinforcement learning subject to a reward function on satisfying re-id pairwise label constraints. In contrast to existing saliency selection methods, this global attention selection approach is more scalable in practice. This is because that most saliency models are local-patch based and assume good inter-image alignment, or it requires complex manipulation of local patch correspondence independently, which may be difficult to scale. The IDEAL attention model is directly estimated under a discriminative re-id matching criterion to jointly maximise a reinforcement agent model by learning reward that it experiences. Moreover, the IDEAL attention selection strategy has the flexibility to be readily integrated with different deep learning features and detectors can benefit directly from models rapidly developed elsewhere. This powerful and deep re-id model is based on the Inception-V3 architecture [45]. This model is learned directly by the identity classification loss rather than the more common pairwise based verification [2, 23] or triplet loss function [11]. This loss selection not only significantly simplifies training data batch construction (e.g. random sampling with no notorious tricks required [22]), but also makes the present model more scalable in practice given a large size training population or imbalanced training data from different camera views. Extensive experiments have been conducted on two large auto-detected datasets CUHK03 [23] and Market-1501 [64] to demonstrate the advantages of the proposed IDEAL model over a wide range (24) of contemporary and state-of-the-art person re-id methods.

Most existing re-id methods [11, 21, 23, 24, 25, 34, 36, 37, 52, 53, 58, 63, 66] focus on supervised learning of person identity-discriminative information. Representative learning algorithms include ranking by pairwise or list-wise constraints [7, 30, 36, 52], discriminative subspace/distance metric learning [21, 24, 25, 37, 58, 59, 66], and deep learning [2, 11, 11, 23, 42, 49, 56]. They typically require a large quantity of person bounding boxes and inter-camera pairwise identity labels, which is prohibitively expensive to collect manually. Automatic Detection in Re-ID: Recent works [23, 64, 65, 65] have started to use automatic person detection for re-id benchmark training and test.

FIG. 1 shows comparisons of person bounding boxes (BB) by manually cropping (MC), automatically detecting (AD), and identity discriminative attention reinforcement learning (IDEAL). Often AD contains more background clutter (see FIG. 1 a, d and e). Both Manually Cropped (MC) BB and AD BB may suffer from occlusion (see FIG. 1c). Both MC & AD BB may lack the identity discriminative attention selection provided/discovered by IDEAL BB (see FIG. 1 b and c).

Auto-detected person bounding boxes contain more noisy background and occlusions with misaligned person cropping (e.g. FIG. 1), impeding discriminative re-id model learning. The problem of post-detection attention selection for re-id has not been addressed in the prior art. Attention selection can benefit independently from detectors rapidly developed by the wider community. Saliency and Attention Selection in Re-ID: Most related re-id techniques are localised patch matching [41, 47, 67] and saliency detection [26, 50, 61, 62]. They are inherently unsuitable by design to cope with poorly detected person images, due to their stringent requirement of tight bounding boxes around the whole person. In contrast, the proposed IDEAL model is designed to overcome inaccurate bounding boxes and therefore can potentially benefit all these existing methods.

Reinforcement Learning in Computer Vision:

Reinforcement Learning (RL) [35] is a problem faced by an agent that learns its optimal behaviour by trial-and-error interactions with a dynamic environment [18]. The promise of RL is offering a way of guiding the agent learning by reward and punishment without the need for specifying how the target tasks are realised. Recently, RL has been successfully applied to a few vision tasks such as object localisation [3, 5, 17, 33], image captioning [27, 40], active object recognition [31]. Compared to the most related fully supervised object localisation by RL [3, 5, 17, 33], the proposed IDEAL model requires little or no accurate object bounding box annotations, and is therefore more scalable to large size data.

Re-ID Attention Selection by Reinforcement Learning

Figure 2:
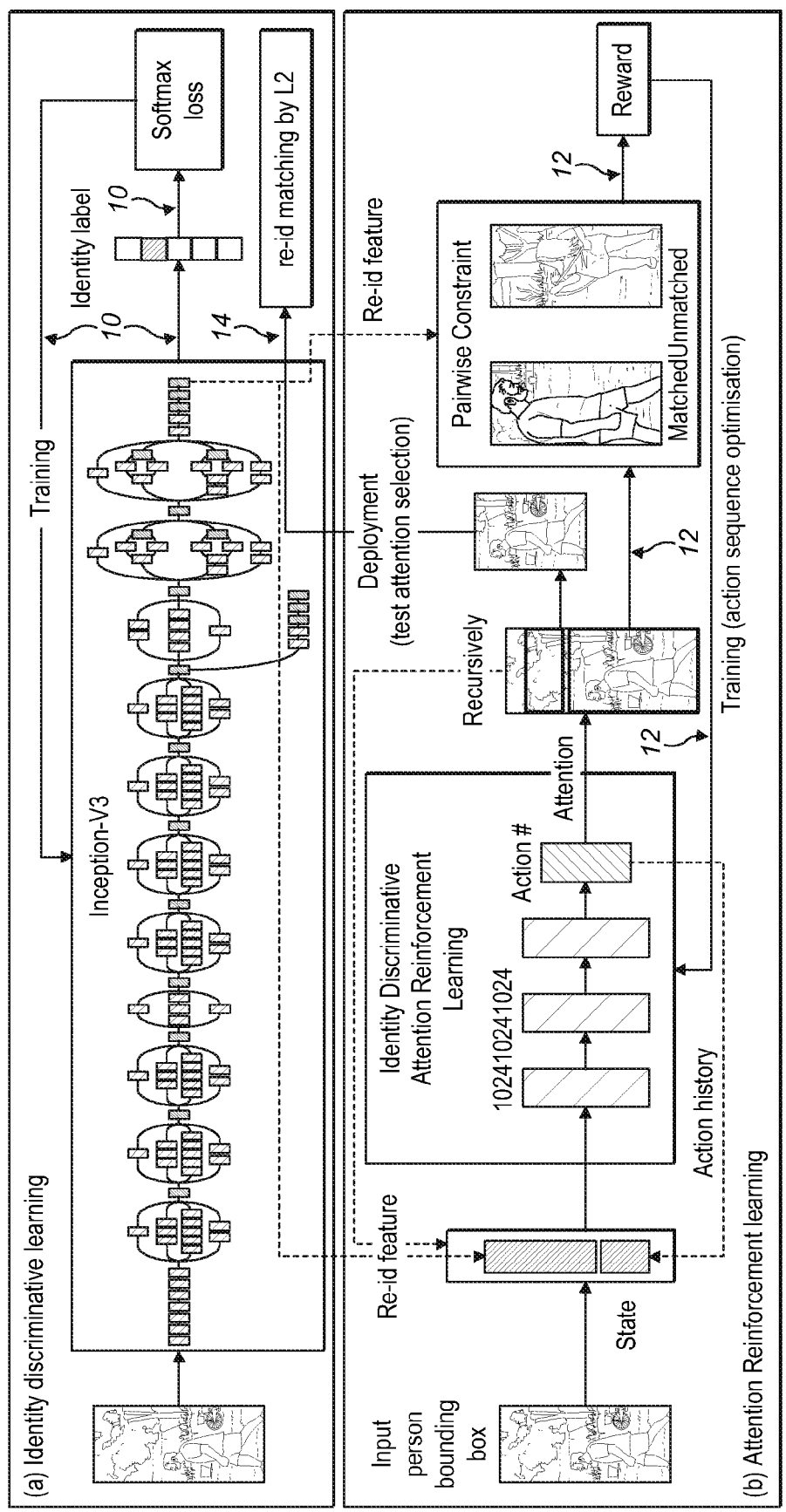
FIG. 2 shows a schematic diagram of the an example embodiment of the present system and method.

FIG. 2 shows schematically, the IDEAL (system) reinforcement learning attention selection. Object representations may be optimised by aligning all target class predictions to target labels using the Stochastic Gradient Descent algorithm, for example. Model learning rates for different parameters may be adaptively computed on-the-fly or in real time, e.g. this may use the Adam algorithm. The IDEAL (system) attention selection may be optimised by reinforcing an object re-id matching reward by satisfying a cross-view re-id pairwise constraint. Stochastic Gradient Descent may also be used for model training, for example.

FIG. 2, section (a) shows an identity discriminative learning branch based on the deep Inception-V3 network optimised by a multi-classification softmax loss (arrows 10). This may also be described as an identity discriminative learning process optimised by a multi-class softmax loss. FIG. 2 section (b) shows an attention reinforcement learning branch designed as a deep Q-network optimised by re-id class label constraints in the deep feature space from branch (section (a)) (arrows 12). This may also be described as an attention reinforcement learning process implemented as a Deep Q-Network (DQN) optimised by re-id label constraints in a deep representation space from process (FIG. 2, section (a)).

After model training, IDEAL (the system) performs re-id matching by determining the optimal attention regions with a distance metric, e.g. L2, L1 or cosine distances. For model deployment, the trained attention branch (b) computes the optimal attention regions for each probe and all the gallery images, extract the deep features from these optimal attention regions in the multi-class re-id branch (a) and perform L2 or L1 (or other) distance metric based matching (arrows 14).

The Identity DiscriminativE Attention reinforcement Learning (IDEAL) model has two subnetworks: (I) A multi-class discrimination network D by deep learning from a training set of auto-detected person bounding boxes (FIG. 2(a)). This part is flexible with many options from existing deep re-id networks and beyond [11, 49, 51, 56]. (II) A re-identification attention network A by reinforcement learning recursively a salient sub-region with its deep feature representation from D that can maximise identity-matching given re-id label constraints (FIG. 2(b)). The attention network is formulated by reinforcement learning and by how this attention network cooperates with the multi-class discrimination network.

Re-ID Attention Selection Formulation

The re-id attention selection is formulated as a reinforcement learning problem [18]. This enables direct correlation with the re-id attention selection process with the learning objective of an "agent" by recursively rewarding or punishing the learning process. In essence, the aim of model learning is to achieve an optimal identity discriminative attending action policy $\alpha=\pi(s)$ of an agent, i.e. a mapping function, that projects a state observation s (model input) to an action prediction a. This exploits the Q-learning technique for learning the proposed IDEAL agent, due to its sample efficiency advantage for a small set of actions [16, 54]. Formally, the system learns an optimal state-value function which measures the maximum sum of the current reward ($R_t$) and all the future rewards ($R_{t+1}$, $R_{t+2}$, . . . ) discounted by a factor $\gamma$ at each time step t:

$$Q^*(s, a) = \max_\pi E[R_t + \gamma R_{t+1} + \gamma^2 R_{t+1} + \ldots \;|\; s_t = s, a_t + a, \pi] \quad \text{Equation 1}$$

Once $Q^*$(s, a) is learned, the optimal policy $\pi^*$(s) can be directly inferred by selecting the action with the maximum $Q^*$(s, a) value in model deployment. More specifically, the reinforcement learning agent interacts with each data sample in a sequential episode, which can be considered as a Markov decision process (MDP) [39]. A specific MDP has been designed for re-id discriminative attention selection, as described below.

Markov Decision Process for Re-ID Attention Selection

A MDP has been designed for re-id attention selection in auto-detected bounding boxes. In particular, each input person bounding box image is considered as a dynamic environment. An IDEAL agent interacts with this dynamic environment to locate the optimal (or at least improved) re-id attention window. To guide this discriminative learning process, a reward encourages those attending actions that improves re-id performance and maximises the cumulative future reward in Eqn. (1). As such, actions, states, and rewards are defined as follows.

Figure 3:
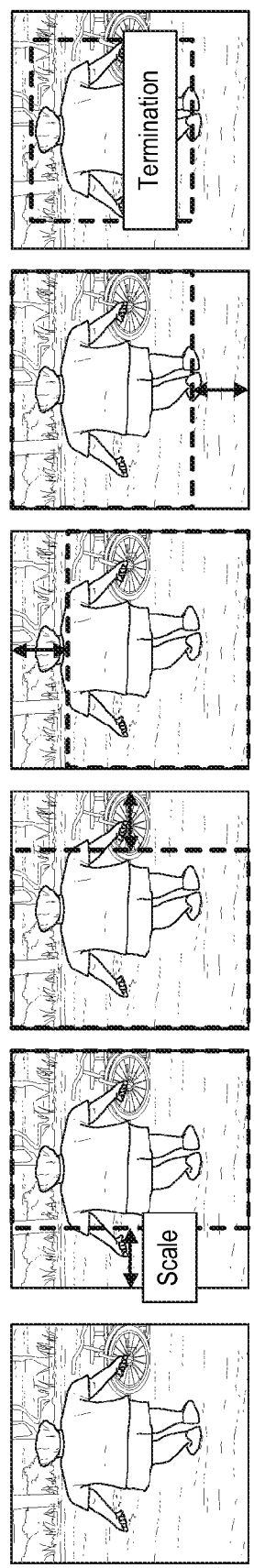
FIG. 3 shows a schematic diagram of a process for changing a bounding box around a target.

FIG. 3 shows target object discriminative attending actions, which are given by an attending scale variable on four directions (left, right, top, bottom). The termination action signals the stop of a recursive attending process.

Actions:

An action set A is defined to facilitate the IDEAL agent to determine the location and size of an "attention window" (FIG. 3). Specifically, an attending action a is defined by the location shift direction ($a_d \in \{\text{left,right,top,bottom}\}$) and shift scale ($a_s \in E$). A termination action is also introduced as a search process stopping signal. A consists of a total of ($4 \times |E|+1$) actions. Formally, the upper-left and bottom-right corner coordinates of the current attention window and an updated attention window be [$x_1$, $y_1$ $x_2$, $y_2$] and respectively, the action set A can then be defined as:

$$A = \{x'_1 = x_1 + \alpha \Delta x, x'_2 = x_2 - \alpha \Delta x, y'_2 = y_2 - \alpha \Delta y, T\}, \quad \text{Equation (2)}$$

where $\alpha \in E$, $\Delta x = x_2 - x_1$, $\Delta y = y_2 - y_1$, T=termination Computationally, each action except termination in A modifies the environment by cutting off a horizontal or vertical stripe. Setting E={5%, 10%, 20%} by cross-validation in experiments, results in a total of 13 actions. Such a small attention action space with multiscale changes has three merits: (1) Only a small number of simple actions are contained, which allows more efficient and stable agent training; (2) Fine-grained actions with small attention changes allow the IDEAL agent sufficient freedoms to utilise small localised regions in auto-detected bounding boxes for subtle identity matching. This enables more effective elimination of undesired background clutter whilst retaining identity discriminative information; (3) The termination action enables the agent to be aware of the satisfactory condition met for attention selection and stops further actions when optimised.

States:

The state $s_t$ of the MDP at time t is defined as the concatenation of the feature vector $x_t \in \mathbb{R}^d$ (with d re-id feature dimension) of current attending window and an action history vector $h_t \in \mathbb{R}^{|E| \times n_{step}}$ (with $n_{step}$ a pre-defined maximal action number per bounding box), i.e. $s_t = [x_t, h_t]$. Specifically, at each time step, the feature vector $x_t$ of current attention window is extracted by the trained re-id network D. The action history vector $h_t$ is a binary vector for keeping a track of all past actions, represented by a $|A|$-dimensional (13 actions) one-hot vector where the corresponding action bit is encoded as one and all others as zeros.

Rewards:

The reward function R (Eqn. (1)) defines the agent task objective. In this example, the reward function of the IDEAL agent's attention behaviour is directly correlated with the re-id matching criterion. Formally, at time step t, suppose the IDEAL agent observes a person image or target $I_t$ and then takes an action $a_t = a \in A$ to attend the image region $I_t^a$. Given this attention shift from $I_t$ to $I_t^a$, its state $s_t$ changes to $s_{t+1}$. We need to assess such a state change and signify the agent if this action is encouraged or discouraged by an award or a punishment (negative reward). To this end, we propose three reward function designs, inspired by pairwise constraint learning principles established in generic information search and person re-id.

Notations

From the labelled training data, two other reference images are sampled w.r.t. $I_t$: (1) A cross-view positive sample $I_t^+$ sharing the same identity as $I_t$ but not the camera view; (2) A same-view negative sample $I_t^-$ sharing the camera view as $I_t$ but not the identity. The features of all these images are computed by D, denoted respectively as $x_t, x_t^a, x_t^+$, and $x_t^-$.

(I) Reward by Relative Comparison

The first reward function $R_t$ is based on relative comparison, in spirit of the triplet loss for learning to rank [28]. It is formulated as:

$$R_t = R_{rc}(s_t, a) = (f_{match}(x_t^a, x_t^-) - f_{match}(x_t^a, x_t^+)) - (f_{match}(x_t, x_t^-) - f_{match}(x_t, x_t^+)) \quad \text{Equation (3)}$$

where $f_{match}$ defines the re-id matching function. The Euclidean distance metric is used given the Inception-V3 deep features. A sparse coding enforced (reduced low-rank) L1 distance (Minkowski distance), or a cosine distance or equivalent normalised distance metrics, may also be used. Intuitively, this reward function commits (i) a positive reward if the attended region becomes more-matched to the cross-view positive sample whilst less-matched to the same-view negative sample, or (ii) a negative reward otherwise. When a is the termination action, i.e. $x_t^a = x_t$, the reward value $R_{rc}$ is set to zero. In this way, the IDEAL agent is supervised to attend the regions subject to optimising jointly two tasks: (1) being more discriminative and/or more salient for the target identity in an inter-view sense (cross-view re-id), whilst (2) pulling the target identity further away from other identities in an intra-view sense (discarding likely shared view-specific background clutter and occlusion therefore focusing more on genuine person appearance).

Figure 4:
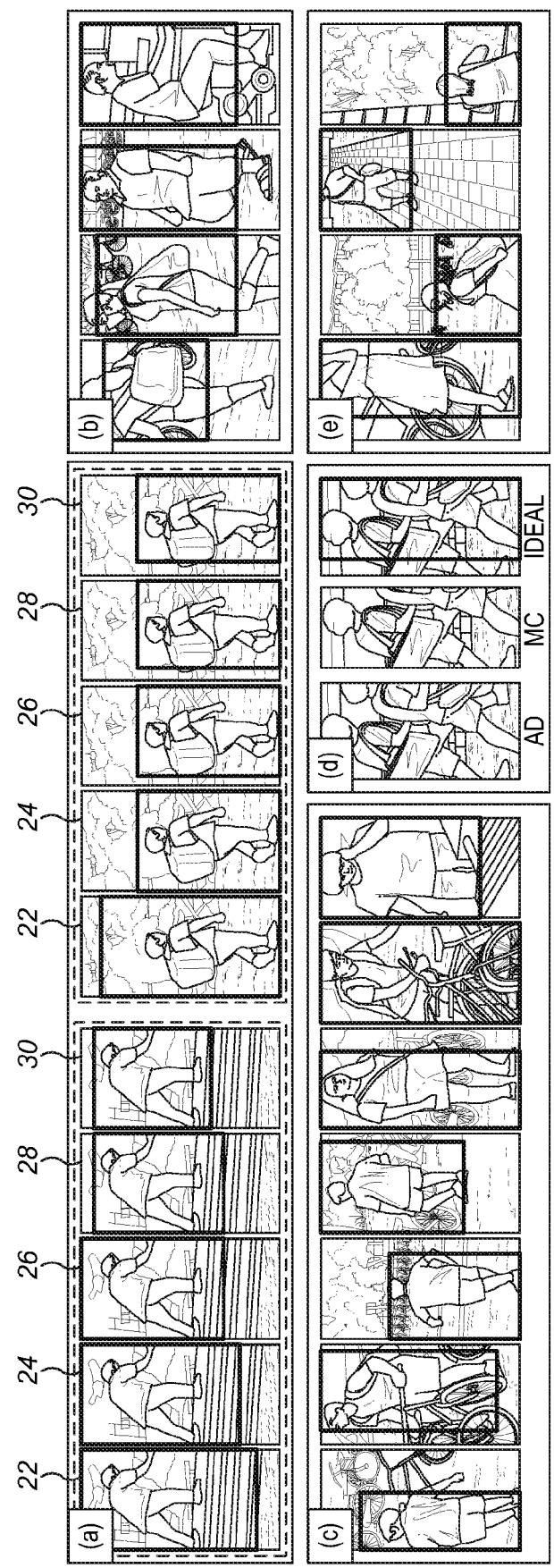
FIG. 4 (a-e) show example action sequences for change bounding boxes around targets.

FIG. 4 shows a Markov decision process (MDP) of attending actions with each action depending only on the current state attained by the previous action. This constitutes a stochastic attention selection mechanism for sequential target re-id saliency attending as a probabilistic dynamic process. FIG. 4 shows the IDEAL (system) attention selection process effects: FIG. 4, section (a) illustrates two examples of action sequence in a left-to-right order for attention selection (action1 (22), action2 (24), action3 (26), action4 (28), action5 (30)). FIG. 4, section (b) shows two examples of cross-view IDEAL attention selection for target re-id. FIG. 4, section (c) shows seven examples of IDEAL attention selection given by 5, 3, 5, 5, 4, 2, and 2 action steps respectively. FIG. 4, section (d) shows a failure case in reducing distraction when an auto-detected (AD) bounding box is confused by two targets. FIG. 4, section (e) shows four examples of IDEAL attention selection on significantly mis-detected bounding boxes in which the prior art methods would all fail to find the positions of true targets.

Importantly, this multi-task objective design favourably allows appearance saliency learning to intelligently select the most informative parts of certain appearance styles for enabling holistic clothing pattern detection and ultimately more discriminative re-id matching (e.g. FIG. 1, section (b) and FIG. 4, section (b)).

(II) Reward by Absolute Comparison

The second reward function considers only the compatibility of a true matching pair, in the spirit of positive verification constraint learning [9]. Formally, this reward is defined as:

$$R_t = R_{ac}(s_t, a) = (f_{match}(x_t, x_t^+)) - (f_{match}(x_t^a, x_t^+)) \quad \text{Equation (4)}$$

The intuition is that, the cross-view matching score of two same-identity images depends on how well irrelevant background clutter/occlusion is removed by the current action. That is, a good attending action will increase a cross-view matching score, and vice verse.

(III) Reward by Ranking

The third reward function concerns the true match ranking change brought by the agent action, therefore simulating directly the re-id deployment rational [13]. Specifically, a binary reward function has been designed according to whether the rank of true match $x_t^+$ is improved when $x_t$ and $x_t^a$ are used as the probe separately, as:

$$R_t = R_r(s_t, a) = \begin{cases} +1, & \text{if Rank } (x_t^+ | x_t) > \text{Rank } (x_t^+ | x_t^a) \\ -1, & \text{otherwise} \end{cases} \quad \text{Equation (5)}$$

where Rank $(x_t^+|x_t)$ Rank$(x_t^+|x_t^a)$ represents the rank of $x_t^+$ in a gallery against the probe $x_t$ ($x_t^a$). Therefore, Eqn. (5) gives support to those actions of leading to a higher rank for the true match, which is precisely the re-id objective. In this example implementation, the gallery was constructed by randomly sampling $n_g$ (e.g. 600) cross-view training samples. The following evaluates and discusses the above three reward function choices in the experiments.

Model Implementation, Training, and Deployment

Implementation and Training

For the multi-class discrimination network D in the IDEAL model, the Inception-V3 network [45] is deployed (FIG. 2(a)), a generic image classification CNN model [45]. It is trained from scratch by a softmax classification loss using person identity labels of the training data. For the re-id attention network A in the IDEAL model, a neural network of 3 fully-connected layers (each with 1024 neurons) was designed and a prediction layer (FIG. 2(b)). This implements the state-value function Eqn. (1). For optimising the sequential actions for re-id attention selection, the ε-greedy learning algorithm [35] is utilised during model training: The agent takes (1) a random action from the action set A with the probability ε, and (2) the best action predicted by the agent with the probability 1-ε. We begin with ε=1 and gradually decrease it by, for example, 0:15 every 1 training epoch until reaching 0:1. The purpose is to balance model exploration and exploitation in the training stage so that local minimum can be avoided. To further reduce the correlations between sequential observations, the experience replay strategy [35] is employed. In particular, a fixed-sized memory pool M is created to store the agent's N past training sample (experiences) $e_t=(s_t, a_t, R_t, s_{t+1})$ at each time step t, i.e. $\{e_{t-N+1}, \ldots, e_t\}$. At iteration i, a mini-batch of training samples is selected randomly from M to update the agent parameters θ by the loss function:

$$L_i(\theta_i) = \mathbb{E}_{(s_t, a_t, R_t, s_{t+1}) \sim \text{Uniform}(M)} \left( \frac{R_t + \gamma \max_{a_{t+1}} Q(s_{t+1}, a_{t+1}, \tilde{\theta}_i) - }{Q(s_t, a_t; \theta_i)} \right)^2 \quad \text{Equation (6)}$$

where $\tilde{\theta}_i$ are the parameters of an intermediate model for predicting training-time target values, which are updated as $\theta_i$ at every ζ iterations, but frozen at other times.

Deployment

During model deployment, the learned attention network A is applied to all test probe and gallery bounding boxes for extracting their attention window images. The deep features of these attention window images are used for person re-id matching by extracting the 2,048-D output from the last fully-connected layer of the discrimination network D. The L2 distance is employed as the re-id matching metric. L1 or cosine distances or equivalent may also be used.

Experiments

Datasets For evaluation, two large benchmarking re-id datasets are used, generated by automatic person detection: CUHK03 [23], and Market-1501 [64] (details in Table 1). CUHK03 also provides an extra version of bounding boxes by human labelling therefore offers a like-to-like comparison between the IDEAL attention selection and human manually cropped images. Example images are shown in (a), (b) and (c) of FIG. 1.

Evaluation Protocol

The standard CUHK03 1260/100 [23] and Market-1501 750/751 [64] training/test person split are adopted. The single-shot setting on CUHK03 is used, both single- and multi-query setting on Market-1501. The cumulative matching characteristic (CMC) is utilised to measure re-id accuracy. For Market-1501, the recall measure of multiple truth matches by mean Average Precision (mAP) was used.

Implementation Details

The IDEAL method is implemented in the TensorFlow framework [1] in this example. An Inception-V3 [45] multi-class identity discrimination network D is trained from scratch for each re-id dataset at a learning rate of 0.0002 by using the Adam optimiser [19]. The final FC layer output feature vector (2,048-D) together with the L2 distance metric is used as the re-id matching model. All person bounding boxes were resized to 299×299 in pixel. The D is trained by 100,000 iterations in this example. The IDEAL attention network A is optimised by the Stochastic Gradient Descent algorithm [4] with the learning rate set to 0.00025. The relative comparison based reward function (Eqn. (3)) by default is used. The experience replay memory (M) size for reinforcement learning was 100,000. The discount factor is factor is fixed γ to 0.8 (Eqn. (1)). A maximum of $n_{step}$=5 action rounds for each episode in training A. The intermediate regard prediction network was updated every ζ=100 iterations. The A was trained by 10 epochs.

Comparisons to the State-of-the-Arts

The IDEAL model was compared against 24 different contemporary and the state-of-the-art re-id methods (Table 2). It is evident that IDEAL achieves the best re-id performance, outperforming the strongest competitor GS-CNN [47] by 2:9% (71.0-68.1) and 17:5% (83.3-65.8) in Rank-1 on CUHK03 and Market-1501 respectively. This demonstrates a clear positive effect of IDEAL's attention selection on person re-id performance by filtering out bounding box misalignment and random background clutter in auto-detected person images. To give more insight and visualise both the effect of IDEAL and also failure cases, qualitative examples are shown in FIG. 4.

TABLE 2

Comparing re-id performance. The top two results are shown in bold with the best shown on the bottom row.

| Dataset | CUHK03(AD) [23] | | | | Market-1501(AD) [64] | | | | | CUHK03(AD) [23] | | | | Market-1501(AD) [64] | | | |
| | | | | | Single Query | | Multi-Query | | | | | | | Single Query | | Multi-Query | |
| Metric (%) | R1 | R5 | R10 | R20 | R1 | mAP | R1 | mAP | | R1 | R5 | R10 | R20 | R1 | mAP | R1 | mAP |
| ITML[10] | 5.1 | 17.7 | 28.3 | — | — | — | — | — | TMA[32] | — | — | — | — | 47.9 | 22.3 | — | — |
| LMNN[55] | 6.3 | 18.7 | 29.0 | — | — | — | — | — | HL[46] | — | — | — | — | 59.5 | — | — | — |
| KISSME[21] | 11.7 | 33.3 | 48.0 | — | 40.5 | 19.0 | — | — | HER[51] | 60.8 | 87.0 | 95.2 | 97.7 | — | — | — | — |

TABLE 2-continued

Comparing re-id performance. The top two results are shown in bold with the best shown on the bottom row.

| Dataset | CUHK03(AD) [23] | | | | Market-1501(AD) [64] | | | | | CUHK03(AD) [23] | | | | Market-1501(AD) [64] | | | |
|---|---|---|---|---|---|---|---|---|---|---|---|---|---|---|---|---|---|
| | | | | | Single Query | | Multi-Query | | | | | | | Single Query | | Multi-Query | |
| Metric (%) | R1 | R5 | R10 | R20 | R1 | mAP | R1 | mAP | | R1 | R5 | R10 | R20 | R1 | mAP | R1 | mAP |
| MFA[58] | — | — | — | — | 45.7 | 18.2 | — | — | FPNN[23] | 19.9 | — | — | — | — | — | — | — |
| kLFDA[58] | — | — | — | — | 51.4 | 24.4 | 52.7 | 27.4 | DCNN+[2] | 44.9 | 76.0 | 83.5 | 93.2 | — | — | — | — |
| BoW[64] | 23.0 | 42.4 | 52.4 | 64.2 | 34.4 | 14.1 | 42.6 | 19.5 | EDM[43] | 52.0 | — | — | — | — | — | — | — |
| XQDA[25] | 46.3 | 78.9 | 83.5 | 93.2 | 43.8 | 22.2 | 54.1 | 28.4 | SICI[49] | 52.1 | 84.9 | 92.4 | — | — | — | — | — |
| MLAPG[24] | 51.2 | 83.6 | 92.1 | 96.9 | — | — | — | — | SSDAL[44] | — | — | — | — | 39.4 | 19.6 | 49.0 | 25.8 |
| L$_1$-Lap [20] | 30.4 | — | — | — | — | — | — | — | S-LSTM [48] | 57.3 | 80.1 | 88.3 | — | — | — | 61.6 | 35.3 |
| NFST[59] | 53.7 | 83.1 | 93.0 | 94.8 | 55.4 | 29.9 | 68.0 | 41.9 | eSDC[61] | 7.7 | 21.9 | 35.0 | 50.0 | 33.5 | 13.5 | — | — |
| LSSCDL[60] | 51.2 | 80.8 | 89.6 | — | — | — | — | — | CAN[26] | 63.1 | 82.9 | 88.2 | 93.3 | 48.2 | 24.4 | — | — |
| SCSP[6] | — | — | — | — | 51.9 | 26.3 | — | — | GS-CNNU[47] | 68.1 | 88.1 | 94.6 | — | 65.8 | 39.5 | 76.0 | 48.4 |
| | | | | | | | | | IDEAL | 71.0 | 89.8 | 93.0 | 95.9 | 83.3 | 62.7 | 87.6 | 70.4 |

AD: Automatically Detected.

TABLE 3

Comparing attention selection methods.

| Dataset | CUHK03 [23] | | | | Market-1501 [64] | | | |
|---|---|---|---|---|---|---|---|---|
| Metric (%) | R1 | R5 | R10 | R20 | R1(SQ) | mAP(SQ) | R1(MQ) | mAP(MQ) |
| eSDC [61] | 7.7 | 21.9 | 35.0 | 50.0 | 33.5 | 13.5 | — | — |
| CAN [26] | 63.1 | 82.9 | 88.2 | 93.3 | 48.2 | 24.4 | — | — |
| GS-CNN [47] | 68.1 | 88.1 | 94.6 | — | 65.8 | 39.5 | 76.0 | 48.4 |
| No Attention | 67.5 | 88.2 | 92.6 | 95.7 | 80.3 | 59.3 | 84.3 | 68.4 |
| Random Attention | 54.1 | 79.2 | 85.9 | 90.4 | 76.1 | 50.6 | 81.1 | 62.7 |
| Centre Attention (95%) | 66.1 | 86.7 | 91.1 | 94.9 | 80.1 | 58.2 | 83.7 | 65.6 |
| Centre Attention (90%) | 64.1 | 85.3 | 90.3 | 93.5 | 79.2 | 55.4 | 83.5 | 61.3 |
| Centre Attention (80%) | 51.9 | 76.0 | 83.0 | 89.0 | 71.9 | 45.8 | 79.4 | 53.3 |
| Centre Attention (70%) | 35.2 | 62.3 | 73.2 | 81.7 | 61.8 | 35.0 | 69.4 | 41.4 |
| Centre Attention (50%) | 16.7 | 38.8 | 49.5 | 62.5 | 39.9 | 18.5 | 46.3 | 23.9 |
| IDEAL(Ranking) | 70.3 | 89.1 | 92.7 | 95.4 | 82.8 | 61.0 | 87.2 | 68.6 |
| IDEAL(Absolute Comparison) | 69.1 | 88.4 | 92.1 | 95.0 | 80.1 | 60.8 | 84.3 | 68.3 |
| IDEAL(Relative Comparison) | 71.0 | 89.8 | 93.0 | 95.9 | 83.3 | 62.7 | 87.6 | 70.4 |

SQ: Single Query;
MQ: Multi-Query

Evaluations on Attention Selection

The IDEAL model was compared against three state-of-the-art saliency/attention based re-id models (eSDC [61], CAN [26], GS-CNN [47]), and two baseline attention methods (Random, Centre) using the Inception-V3 re-id model (Table 3). For Random Attention, randomly person bounding boxes we attended by a ratio (%) randomly selected from {95, 90, 80, 70, 50}. This was repeated 10 times and the mean results were reported. For Centre Attention, all person bounding boxes were attended at centre by one of the same 5 ratios above. It is evident that the IDEAL (Relative Comparison) model is the best. The inferior re-id performance of eSDC, CAN and GS-CNN is due to their strong assumption on accurate bounding boxes. Both Random and Centre Attention methods do not work either with even poorer re-id accuracy than that with "No Attention" selection. This demonstrates that optimal attention selection given by IDEAL is non-trivial. Among the three attention reward functions, Absolute Comparison is the weakest, likely due to the lack of reference comparison against false matches, i.e. no population-wise matching context in attention learning. Ranking fares better, as it considers reference comparisons. The extra advantage of Relative Comparison is due to the same-view negative comparison in Eqn. (3). This provides a more reliable background clutter detection since same-view images are more likely to share similar background patterns.

Auto-Detection+IDEAL vs. Manually Cropped

Table 4 shows that auto-detection+IDEAL can perform similarly to that of manually cropped images in CUHK03 test[1], e.g. 71.0% vs. 71.9% for Rank-1 score. This shows the potential of IDEAL in eliminating expensive manual labelling of bounding boxes and for scaling up re-id to large data deployment.

TABLE 4

Auto-detection + IDEAL vs. manually cropped re-id on CUHK03

| Metric (%) | R1 | R5 | R10 | R20 |
|---|---|---|---|---|
| Auto-Detected + IDEAL | 71.0 | 89.8 | 93.0 | 95.9 |
| Manually Cropped | 71.9 | 90.4 | 94.5 | 97.1 |

Effect of Action Design

Three designs with distinct attention scales were examined. Table 5 shows that the most fine-grained design {5%, 10%, 20%} is the best. This suggests that the re-id by appearance is subtle and small regions make a difference in discriminative matching.

TABLE 5

Attention action design evaluation.

| Dataset | CUHK03 [23] | | | | Market-1501 [64] | | | |
|---|---|---|---|---|---|---|---|---|
| Metric (%) | R1 | R5 | R10 | R20 | R1(SQ) | mAP(SQ) | R1(MQ) | mAP(MQ) |
| {5%, 10%, 20%} | 71.0 | 89.8 | 93.0 | 95.9 | 83.3 | 62.7 | 87.6 | 70.4 |
| {10%, 20%, 30%} | 68.3 | 88.1 | 91.8 | 95.0 | 83.2 | 62.1 | 86.3 | 68.3 |
| {10%, 20%, 50%} | 67.6 | 87.5 | 91.4 | 93.9 | 82.1 | 61.5 | 85.8 | 67.5 |

SQ: Single Query;
MQ: Multi-Query.

In summary, an Identity DiscriminativE Attention reinforcement Learning (IDEAL) model for optimising re-id attention selection in auto-detected bounding boxes is provided. This improves notably person re-id accuracy in a fully automated process required in practical deployments. The IDEAL model is formulated as a unified framework of discriminative identity learning by a deep multi-class discrimination network and attention reinforcement learning by a deep Q-network. This develops and improves a learning model. This achieves jointly optimal identity sensitive attention selection and re-id matching performance by a reward function subject to identity label pairwise constraints. Extensive comparative evaluations on two auto-detected re-id benchmarks show clearly the advantages and superiority of this IDEAL (learning) model in coping with bounding box misalignment and background clutter removal when compared to the state-of-the-art saliency/attention based re-id models. Moreover, this IDEAL automatic attention selection mechanism comes near to be equal to human manual labelling of person bounding boxes on re-id accuracy, therefore showing a great potential for scaling up automatic re-id to large data deployment.

Figure 5:
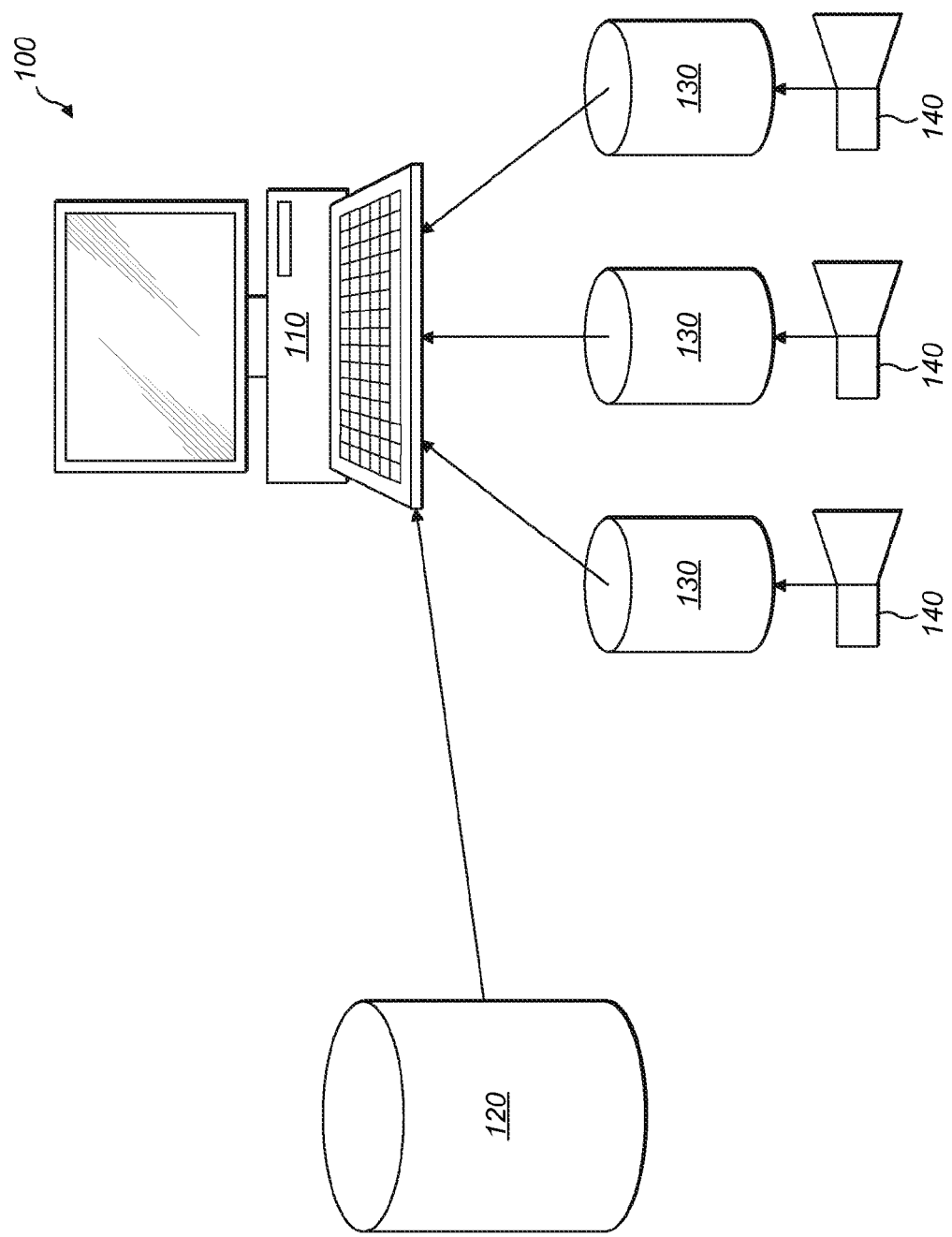
FIG. 5 shows a schematic diagram of a system for executing a method of target re-identification.

FIG. 5 illustrates schematically portions of a system 100 for implementing the target re-identification method. A server (or several servers) 110 implements the method, preferably as a neural network. When the system 100 is in learning mode then a set of training data is received from a data store 120. Once the model is sufficiently trained then it may be used to identify targets that have not been labelled. Data may be processed from a single source or any number of sources. FIG. 5 illustrates three sources of data stored in separate data stores 130 that each acquire video data from cameras 140. However, multiple sources of data may be stored in the same data store 130, a different number of data stores, either locally or distributed in a cloud or clouds, or processed in real time directly from cameras.

The server may contain a processor with one or preferably multiply CPU cores and GPUs as well as memory storing program instructions for running either or both the training method and searching or targeting method (i.e. to identify and confirm unknown targets or the same target in different views from the same or different sources).

The system 100 may provide an output of results either directly on a display, by sending to another workstation or storing the results for later analysis (e.g. within data store 120). The learning model may be stored and updated (following the reward recursive process) within the data store 120 or within the server or other memory.

Figure 6:
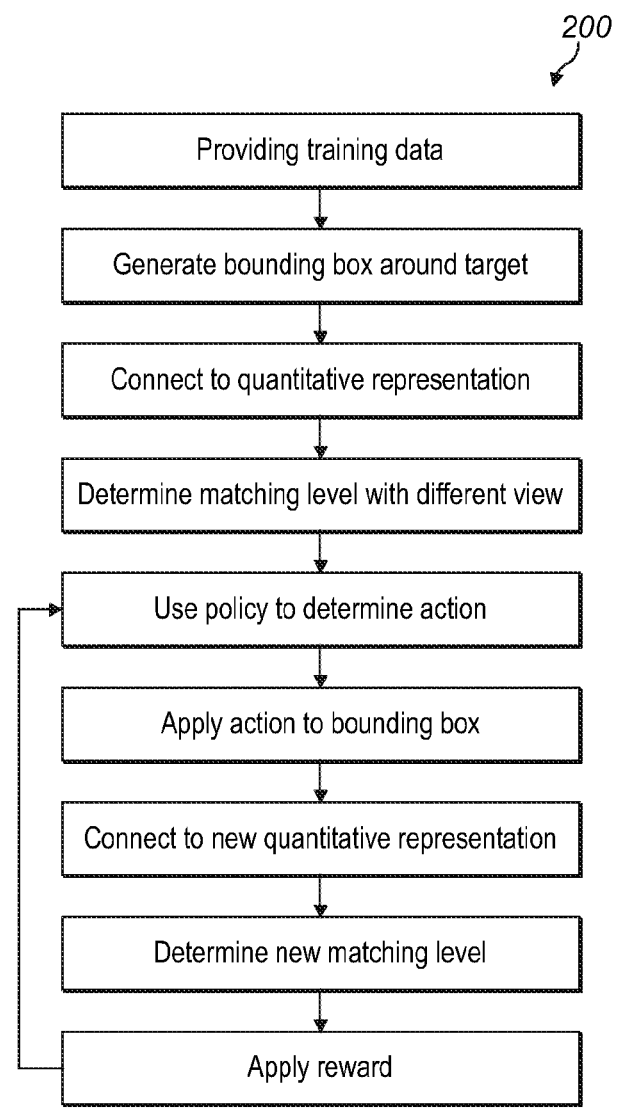
FIG. 6 shows a flow diagram of a method of target re-identification.

FIG. 6 shows a flow diagram of the target re-identification method 200. This method may be used with the system in a training mode (i.e. developing and improving the learning model). In step 210, the training data is provided to the system. The training data may include video data that includes targets (e.g. people) that have been labelled so that targets in one or more views can be matched to the same target in another view (e.g. from the same or different source of video data). For example, an individual may be captured on video by one camera in one location and the same individual may be captured by a different camera (or the same camera) in another location. Typically, training data may be labelled manually.

At step 220, a bounding box is generated around a target or potential target. This may be achieved automatically using one of several techniques known to the skilled person. The region within this first attempt bounding box is converted to a quantitative representation, such as a set of feature vectors, at step 230. This allows the bounded target to be compared to a different view of the same labelled target. This comparison results in the determination of a matching level or other metric, at step 240.

The learning model may have a starting set of conditions or parameters. This learning model is used to determine an action to perform on the bounding box surrounding the target in the first view (step 250). This determined action is applied to the bounding box, which is updated at step 260.

A new quantitative representation is generated at step 270 and a new matching level is found at step 280. If the matching level has improved then a reward is applied to the learning model (e.g. according to equation1). The process loops back to step 250 until either a particular number of loops is repeated or a condition is met. The method 200 may be repeated many times for different target pairs (i.e. different views of the same target). Once all target pairs are processed (or after a set number or repetitions, or when a success criteria is reached) then the learning model may be considered sufficiently optimised to be used with real data (i.e. not training data).

In order to process real data then a similar loop of steps may take place but without the applying a reward to the learning model (as the targets in different views will not be known to be matching pairs). In this way, the model may be used to quickly and effectively process potential target matches by improving the bounding of unknown targets.

As will be appreciated by the skilled person, details of the above embodiment may be varied without departing from the scope of the present invention, as defined by the appended claims.

For example, the neural network may contain a different number of neurons. Different training sets may be used.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

REFERENCES

[1] Martin Abadi, Ashish Agarwal, Paul Barham, Eugene Brevdo, Zhifeng Chen, Craig Citro, Greg S Corrado, Andy Davis, Jeffrey Dean, Matthieu Devin, et al. Tensorflow: Large-scale machine learning on heterogeneous distributed systems. *arXiv*, 2016.
[2] Ejaz Ahmed, Michael J. Jones, and Tim K. Marks. An improved deep learning architecture for person re-dentification. In *IEEE Conference on Computer Vision and Pattern Recognition*, 2015.
[3] Miriam Bellver, Xavier Giró-i Nieto, Ferran Marques, and Jordi Torres. Hierarchical object detection with deep reinforcement learning. *arXiv preprint arXiv:1611.03718*, 2016.
[4] Leon Bottou. Stochastic gradient descent tricks. In *Neural networks: Tricks of the trade*, pages 421-436. 2012.
[5] Juan C Caicedo and Svetlana Lazebnik. Active object localization with deep reinforcement learning. In *Proceedings of the IEEE International Conference on Computer Vision*, pages 2488-2496, 2015.
[6] Dapeng Chen, Zejian Yuan, Badong Chen, and Nanning Zheng. Similarity learning with spatial constraints for person re-identification. In *IEEE Conference on Computer Vision and Pattern Recognition*, 2016.
[7] Jiaxin Chen, Zhaoxiang Zhang, and Yunhong Wang. Relevance metric learning for person re-identification by exploiting listwise similarities. *Image Processing, IEEE Transactions on*, 24(12):4741-4755, 2015.
[8] Dong Seon Cheng, Marco Cristani, Michele Stoppa, Loris Bazzani, and Vittorio Murino. Custom pictorial structures for re-identification. In *British Machine Vision Conference*, 2011.
[9] Sumit Chopra, Raia Hadsell, and Yann LeCun. Learning a similarity metric discriminatively, with application to face verification. In *IEEE Conference on Computer Vision and Pattern Recognition*, 2005.
[10] Jason V. Davis, Brian Kulis, Prateek Jain, Suvrit Sra, and Inderjit S. Dhillon. Information-theoretic metric learning. In *International Conference on Machine learning*, 2007.
[11] Shengyong Ding, Liang Lin, Guangrun Wang, and Hongyang Chao. Deep feature learning with relative distance comparison for person re-identification. *Pattern Recognition*, 48(10):2993-3003, 2015.
[12] Pedro F Felzenszwalb, Ross B Girshick, David McAllester, and Deva Ramanan. Object detection with discriminatively trained part-based models. *IEEE Transactions on Pattern Analysis and Machine Intelligence*, 32(9):1627-1645, 2010.
[13] Shaogang Gong, Marco Cristani, Change Loy Chen, and Timothy M. Hospedales. The re-identification challenge. In *Person Re-Identification*. Springer, 2014. Shaogang Gong, Marco Cristani, Shuicheng Yan, and Chen Change Loy. *Person re-identification*. Springer, January 2014.
[14] Douglas Gray, Shane Brennan, and Hai Tao. Evaluating appearance models for recognition, reacquisition and tracking. In *IEEE International Workshop on Performance Evaluation for Tracking and Surveillance*, 2007.
[15] Shixiang Gu, Timothy Lillicrap, Zoubin Ghahramani, Richard E Turner, and Sergey Levine. Q-prop: Sample-efficient policy gradient with an off-policy critic. 2017.
[16] Zequn Jie, Xiaodan Liang, Jiashi Feng, Xiaojie Jin, Wen Lu, and Shuicheng Yan. Tree-structured reinforcement learning for sequential object localization. In *Advances in Neural Information Processing Systems*, pages 127-135, 2016.
[17] Leslie Pack Kaelbling, Michael L Littman, and Andrew W Moore. Reinforcement learning: A survey. *Journal of Artificial Intelligence Research*, 4:237-285, 1996.
[18] Diederik Kingma and Jimmy Ba. Adam: A method for stochastic optimization. *arXiv*, 2014.
[19] Elyor Kodirov, Tao Xiang, Zhenyong Fu, and Shaogang Gong. Person re-identification by unsupervised 11 graph learning. In *European Conference on Computer Vision*, 2016.
[20] Martin Koestinger, Martin Hirzer, Paul Wohlhart, Peter M. Roth, and Horst Bischof. Large scale metric learning from equivalence constraints. In *IEEE Conference on Computer Vision and Pattern Recognition*, 2012.
[21] Alex Krizhevsky, Ilya Sutskever, and Geoffrey E Hinton. Imagenet classification with deep convolutional neural networks. In Advances in Neural Information Processing Systems, 2012.
[22] Wei Li, Rui Zhao, Tong Xiao, and Xiaogang Wang. Deepreid: Deep filter pairing neural network for person re-identification. In IEEE Conference on Computer Vision and Pattern Recognition, 2014.
[23] Shengcai Liao and Stan Z. Li. Efficient psd constrained asymmetric metric learning for person re-identification. In IEEE International Conference on Computer Vision, 2015.
[24] Shengcai Liao, Yang Hu, Xiangyu Zhu, and Stan Z Li. Person re-identification by local maximal occurrence representation and metric learning. In IEEE Conference on Computer Vision and Pattern Recognition, 2015.
[25] Hao Liu, Jiashi Feng, Meibin Qi, Jianguo Jiang, and Shuicheng Yan. End-to-end comparative attention networks for person re-identification. arXiv, 2016.
[26] Siqi Liu, Zhenhai Zhu, Ning Ye, Sergio Guadarrama, and Kevin Murphy. Optimization of image description metrics using policy gradient methods. arXiv: 1612.00370, 2016.
[27] Tie-Yan Liu et al. Learning to rank for information retrieval. Foundations and Trends□R in Information Retrieval, 3(3):225-331, 2009.
[28] Chen Change Loy, Tao Xiang, and Shaogang Gong. Multi-camera activity correlation analysis. In IEEE Conference on Computer Vision and Pattern Recognition, 2009.
[29] Chen Change Loy, Chunxiao Liu, and Shaogang Gong. Person re-identification by manifold ranking. In IEEE International Conference on Image Processing, 2013.
[30] Mohsen Malmir, Karan Sikka, Deborah Forster, Ian Fasel, Javier R Movellan, and Garrison W Cottrell. Deep active object recognition by joint label and action prediction. Computer Vision and Image Understanding, 156: 128-137, 2017.
[31] Niki Martinel, Abir Das, Christian Micheloni, and Amit K Roy-Chowdhury. Temporal model adaptation for person re-identification. In European Conference on Computer Vision, 2016.
[32] Stefan Mathe, Aleksis Pirinen, and Cristian Sminchisescu. Reinforcement learning for visual object detection. In Proceedings of the IEEE Conference on Computer Vision and Pattern Recognition, pages 2894-2902, 2016.
[33] Alexis Mignon and Frédéric Jurie. Pcca: A new approach for distance learning from sparse pairwise constraints. In IEEE Conference on Computer Vision and Pattern Recognition, 2012.
[34] Volodymyr Mnih, Koray Kavukcuoglu, David Silver, Andrei A Rusu, Joel Veness, Marc G Bellemare, Alex Graves, Martin Riedmiller, Andreas K Fidjeland, Georg Os-trovski, et al. Human-level control through deep reinforcement learning. Nature, 518 (7540):529-533, 2015.

[35] Sakrapee Paisitkriangkrai, Chunhua Shen, and Anton van den Hengel. Learning to rank in person re-identification with metric ensembles. In IEEE Conference on Computer Vision and Pattern Recognition, 2015.

[36] Sateesh Pedagadi, James Orwell, Sergio A. Velastin, and Boghos A. Boghossian. Local fisher discriminant analysis for pedestrian re-identification. In IEEE Conference on Computer Vision and Pattern Recognition, 2013.

[37] Bryan Prosser, Wei-Shi Zheng, Shaogang Gong, and Tao Xiang. Person re-identification by support vector ranking. In British Machine Vision Conference, 2010.

[38] Martin L. Puterman. Markov Decision Processes: Discrete Stochastic Dynamic Programming. John Wiley & Sons, Inc., New York, N.Y., USA, 1st edition, 1994. ISBN 0471619779.

[39] Steven J Rennie, Etienne Marcheret, Youssef Mroueh, Jarret Ross, and Vaibhava Goel. Self-critical sequence training for image captioning. arXiv:1612.00563, 2016.

[40] Yang Shen, Weiyao Lin, Junchi Yan, Mingliang Xu, Jianxin Wu, and Jingdong Wang. Person re-identification with correspondence structure learning. In IEEE International Conference on Computer Vision, pages 3200-3208, 2015.

[41] Hailin Shi, Xiangyu Zhu, Shengcai Liao, Zhen Lei, Yang Yang, and Stan Z Li. Constrained deep metric learning for person re-identification. arXiv preprint arXiv: 1511.07545, 2015.

[42] Hailin Shi, Yang Yang, Xiangyu Zhu, Shengcai Liao, Zhen Lei, Weishi Zheng, and Stan Z Li. Embedding deep metric for person re-identification: A study against large variations. In European Conference on Computer Vision, 2016.

[43] Chi Su, Shiliang Zhang, Junliang Xing, Wen Gao, and Qi Tian. Deep attributes driven multi-camera person re-identification. In European Conference on Computer Vision, pages 475-491. Springer, 2016.

[44] Christian Szegedy, Vincent Vanhoucke, Sergey Ioffe, Jon Shlens, and Zbigniew Wojna. Rethinking the inception architecture for computer vision. In IEEE Conference on Computer Vision and Pattern Recognition.

[45] Evgeniya Ustinova and Victor Lempitsky. Learning deep embeddings with histogram loss. In Advances in Neural Information Processing Systems, pages 4170-4178, 2016.

[46] Rahul Rama Varior, Mrinal Haloi, and Gang Wang. Gated siamese convolutional neural network architecture for human re-identification. In European Conference on Computer Vision, 2016.

[47] Rahul Rama Varior, Bing Shuai, Jiwen Lu, Dong Xu, and Gang Wang. A siamese long short-term memory architecture for human re-identification. In European Conference on Computer Vision, 2016.

[48] Faqiang Wang, Wangmeng Zuo, Liang Lin, David Zhang, and Lei Zhang. Joint learning of single-image and cross-image representations for person re-identification. In IEEE Conference on Computer Vision and Pattern Recognition, 2016.

[49] Hanxiao Wang, Shaogang Gong, and Tao Xiang. Unsupervised learning of genera-tive topic saliency for person re-identification. In British Machine Vision Conference, Nottingham, United Kingdom, September 2014.

[50] Hanxiao Wang, Shaogang Gong, and Tao Xiang. Highly efficient regression for scalable person re-identification. In British Machine Vision Conference, 2016.

[51] T. Wang, S. Gong, X. Zhu, and S. Wang. Person re-identification by discriminative selection in video ranking. IEEE Transactions on Pattern Analysis and Machine Intelligence, January 2016.

[52] Taiqing Wang, Shaogang Gong, Xiatian Zhu, and Shengjin Wang. Person re-identification by video ranking. In European Conference on Computer Vision, 2014.

[53] Christopher John Cornish Hellaby Watkins. Learning from delayed rewards. PhD thesis, University of Cambridge England, 1989.

[54] Kilian Q. Weinberger and Lawrence K. Saul. Distance metric learning for large margin nearest neighbor classification. The Journal of Machine Learning Research, 10:207-244, December 2009.

[55] Tong Xiao, Hongsheng Li, Wanli Ouyang, and Xiaogang Wang. Learning deep feature representations with domain guided dropout for person re-identification. In IEEE Conference on Computer Vision and Pattern Recognition, 2016.

[56] Tong Xiao, Shuang Li, Bochao Wang, Liang Lin, and Xiaogang Wang. End-to-end deep learning for person search. arXiv:1604.01850, 2016.

[57] Fei Xiong, Mengran Gou, Octavia Camps, and Mario Sznaier. Person re-identification using kernel-based metric learning methods. In European Conference on Computer Vision. 2014.

[58] Li Zhang, Tao Xiang, and Shaogang Gong. Learning a discriminative null space for person re-identification. In IEEE Conference on Computer Vision and Pattern Recognition, 2016.

[59] Ying Zhang, Baohua Li, Huchuan Lu, Atshushi Irie, and Xiang Ruan. Sample-specific svm learning for person re-identification. In IEEE Conference on Computer Vision and Pattern Recognition, 2016.

[60] Rui Zhao, Wanli Ouyang, and Xiaogang Wang. Unsupervised salience learning for person re-identification. In IEEE Conference on Computer Vision and Pattern Recognition, 2013.

[61] Rui Zhao, Wanli Ouyang, and Xiaogang Wang. Person re-identification by salience matching. In IEEE International Conference on Computer Vision, 2013.

[62] Rui Zhao, Wanli Ouyang, and Xiaogang Wang. Learning mid-level filters for person re-identification. In IEEE Conference on Computer Vision and Pattern Recognition, 2014.

[63] Liang Zheng, Liyue Shen, Lu Tian, Shengjin Wang, Jingdong Wang, and Qi Tian. Scalable person re-identification: A benchmark. In IEEE International Conference on Computer Vision, 2015.

[64] Liang Zheng, Hengheng Zhang, Shaoyan Sun, Manmohan Chandraker, and Qi Tian. Person re-identification in the wild. arXiv preprint arXiv:1604.02531, 2016.

[65] Wei-Shi Zheng, Shaogang Gong, and Tao Xiang. Re-identification by relative distance comparison. IEEE Transactions on Pattern Analysis and Machine Intelligence, pages 653-668, March 2013.

[66] Wei-Shi Zheng, Xiang Li, Tao Xiang, Shengcai Liao, Jianhuang Lai, and Shaogang Gong. Partial person re-identification. In IEEE International Conference on Computer Vision, pages 4678-4686, 2015.

The invention claimed is:

1. A computer implemented method of training a machine to identify a target within video data, the method comprising the steps of:

providing a training data set including identified labelled targets within video data having the same target within different video views;

generating, using a learning model, a bounding box action policy for determining required adjustments to a bounding box around a target in the video data by:
  generating a bounding box around a labelled target within a first view of the video data;
  converting the target bounded by the bounding box to a quantitative representation;
  determining a matching level between the quantitative representation and a quantitative representation of a further labelled target within the video data from a second view different to the first view; and
  looping the following steps one or more times, the looped steps comprising:
    using the bounding box action policy to determine an action to change the bounding box;
    applying the determined action to change the bounding box to a new bounding box;
    converting the target bounded by the new bounding box to a new quantitative representation;
    determining a further matching level between the new quantitative representation and the quantitative representation of the labelled target within the video data from the second view; and
    applying a reward to the learning model to adjust the bounding box action policy based on an improvement in the matching level.

2. The computer implemented method of claim 1, wherein the quantitative representations are sets of feature vectors.

3. The computer implemented method of claim 2, wherein the feature vectors are 1-D high dimensional feature maps, 2-D feature maps, or 3-D volumes.

4. The computer implemented method of claim 1, wherein the quantitative representations are: matrices, or probability distributions or histograms.

5. The computer implemented method of claim 1, wherein the first view and the second view contain a target with the same label.

6. The computer implemented method of claim 1, wherein the bounding box is rectangular.

7. The computer implemented method of claim 1, wherein the action to change the bounding box is any one or more of: moving the bounding box up, down, left or right; reducing the size of the bounding box from the top, bottom, left and/or right; increasing the size of the bounding box to the top, bottom, left, and/or right, or any combination of these.

8. The computer implemented method of claim 1, wherein the reward is a positive reward if the matching level improves and wherein the reward is a negative reward if the matching level decreases.

9. The computer implemented method of claim 1, wherein the reward is applied using a reward function.

10. The computer implemented method of claim 9, wherein the reward function is formed from one or more of: a relative comparison reward, a reward by absolute comparison, and/or a reward by ranking.

11. The computer implemented method of claim 1, wherein the method is implemented by a neural network.

12. The computer implemented method of claim 1, wherein the loop ends when a criteria is reached.

13. The computer implemented method of claim 1 further comprising the step of:
  using the bounding box action policy to predict a probability that the action will improve the matching level.

14. The computer implemented method of claim 13, wherein the loop is ended when the matching level satisfies a target level.

15. The computer implemented method of claim 1, wherein the loop is ended after a predetermined number of loops.

16. The computer implemented method of claim 1, wherein the first view and the second view come from different sources of data and/or video cameras.

17. One or more non-transitory computer-readable media having computer-executable instructions stored thereon that, when executed by a processor, cause the processor to:
  receive video data;
  generate bounding boxes around two or more targets within different views of the video data;
  convert the bounded targets to a quantitative representations;
  determine a matching level between the quantitative representations of the bounded targets; and
  loop one or more times the following steps:
    using the bounding box action policy generated according to any of claims 1 to 16 to determine an action to change the bounding box around at least one of the two or more targets within the video data;
    applying the determined action to change the bounding box to a new bounding box;
    converting the target bounded by the new bounding box to a new quantitative representation; and
    determining a further matching level between the new quantitative representation and the quantitative representations of the labelled target within the video data.

18. The one or more non-transitory computer-readable media of claim 17, wherein the loop ends when the matching level satisfies a target level.

19. A system comprising:
  one or more processors; and
  memory storing instructions that, when executed by the at least one processor, cause the processor to perform:
    providing a training data set including identified labelled targets within video data having the same target within different video views;
    generating, using a learning model, a bounding box action policy for determining required adjustments to a bounding box around a target in the video data by:
      generating a bounding box around a labelled target within a first view of the video data;
      converting the target bounded by the bounding box to a quantitative representation;
      determining a matching level between the quantitative representation and a quantitative representation of a further labelled target within the video data from a second view different to the first view; and
      looping the following steps one or more times, the looped step comprising:
        using the bounding box action policy to determine an action to change the bounding box;
        applying the determined action to change the bounding box to a new bounding box;
        converting the target bounded by the new bounding box to a new quantitative representation;
        determining a further matching level between the new quantitative representation and the quantitative representation of the labelled target within the video data from the second view; and
        applying a reward to the learning model to adjust the bounding box action policy based on an improvement in the matching level.

20. The system of claim 19, further comprising an interface for receiving the video data from one or more sources.

* * * * *